United States Patent [19]

Häeusler et al.

[11] 4,386,849
[45] Jun. 7, 1983

[54] METHOD OF MOIRE-METRICAL TESTING OF OPTICAL IMAGING SYSTEMS

[75] Inventors: Gerd Häeusler, Erlangen; Walter Jäerisch, Boeblingen, both of Fed. Rep. of Germany

[73] Assignee: International Business Machines Corporation, Armonk, N.Y.

[21] Appl. No.: 266,242

[22] Filed: May 22, 1981

[30] Foreign Application Priority Data

May 24, 1980 [DE] Fed. Rep. of Germany ....... 3019930

[51] Int. Cl.³ .............................................. G01B 9/00
[52] U.S. Cl. ................................................. 356/124
[58] Field of Search ...................... 356/124, 124.5, 127

[56] References Cited

U.S. PATENT DOCUMENTS 1,590,532 6/1926 Lenouvel ............................ 356/124
3,829,219 8/1974 Wyant ................................. 356/124

FOREIGN PATENT DOCUMENTS 731911 4/1966 Canada ............................... 356/124

Primary Examiner—R. A. Rosenberger
Attorney, Agent, or Firm—Jackson E. Stanland

[57] ABSTRACT

A method for testing optical imaging systems by the use of moiré stripes, wherein two copies of an optical grating are made and simultaneously illuminated to produce a moiré pattern which is a measure of the distortion of the imaging system. In a first step an original grating is transferred by a light beam as a contact copy onto a substrate. In a second step, the imaging system to be tested copies the original grating for a second time onto the substrate, except that the second grating copy is rotated slightly with respect to the first grating copy. The points of intersection of the two superimposed gratings produce moiré stripes when illuminated, the positions of the stripes being calculated precisely with the assumption that ideal gratings were used. If the imaging system to be tested shows distortions, the position of the moiré stripes that are observed will not correspond to these calculated positions. The deviation therefrom is a measure of the imaging system errors.

11 Claims, 11 Drawing Figures

FIG. 5A
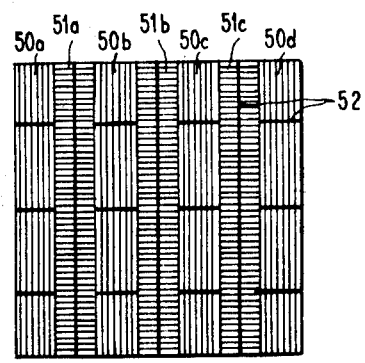
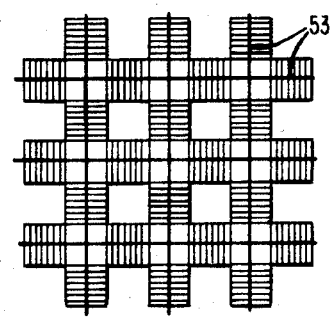
FIG. 5B
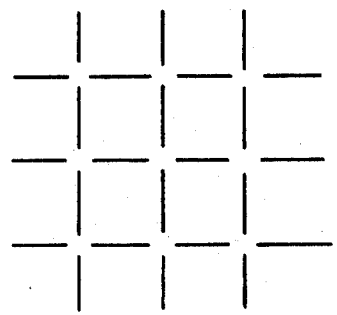
FIG. 5C

METHOD OF MOIRE-METRICAL TESTING OF OPTICAL IMAGING SYSTEMS

DESCRIPTION

TECHNICAL FIELD

The invention relates to a method of moiré-metrically testing optical imaging systems, wherein two copies of an optical grating are made and simultaneously illuminated to produce a moiré pattern which is a measure of the distortion of the imaging system.

BACKGROUND ART

In many fields of research and technology, optical imaging systems are used on which increasing demands for precision are made. The photolithographic methods used in the production of integrated semiconductor circuits are a particularly important example. The efforts to reduce the manufacturing costs of such circuits and to increase the switching speed lead on the one hand to a minimization of the circuits and consequently to their increased density on the semiconductor chip, and on the other hand to continuously increased dimensions of the semiconductor wafers on which a plurality of such semiconductor chips (chips) can be processed in one process step. At present the smallest circuit structures that can be made by means of photolithographic methods in the visible range of the spectrum are approximately 2 $\mu$m. The semiconductor wafers, and consequently the field of view of the optical imaging systems used have reached a diameter of 10 to 15 cm. The high demands on the precision of the optical imaging systems involve even stricter demands on the precision of the methods applied for testing such imaging systems. If circuit structures with a minimum size of 1 $\mu$m are to be made it is necessary to define the imaging characteristics of the photolithographic systems down to a precision of 0.1 $\mu$m. These tests refer to the following parameters:

1. The local distortion of the imaging system at each point of the field of view. If the individual local distortion of each imaging system is known, systems with the same on similar local distortion characteristics can be selected and used together in one production line where several exposure steps with different systems are to be carried out. In this manner the overall yield, referring to the entire semiconductor wafer, can be increased considerably.
2. Scale errors, i.e. deviations from the theoretical imaging scale of the imaging system (in photolithographic processes frequently 1:1).
3. Further errors, as follow:
   rotation, i.e. global rotations
   translation, i.e. global shifts
   orthogonality, i.e. angular distortions.

All these errors, while together represent the distortion, should be known individually for each point of the entire field of view. In the prior art, however, no methods are known by which such measurements can be executed with acceptable efforts and the necessary precision.

The testing process which is used most frequently today consists of imaging a specific test pattern, e.g. a vernier raster by the system to be tested, and measuring the image point by point, e.g. microscopically, in order to locate distortion errors. This method is, however, very time-consuming so that only a few points (e.g. 9) of the field of view can be measured. Furthermore, the precision that can be reached very much depends on the operator's practice and care (the respective points are individual points, and there is no automatic averaging over large local areas).

Apart from the measurement of individual points it is also possible to apply methods according to which large areas of the fields of view are tested in parallel for distortion errors. For that purpose, test patterns can be used which are imaged by the system to be tested, and subsequently tested for deviations. With test patterns having a periodic structure, the copy can be tested interferometrically, as shown in copending German patent application P 30 20 022.7, filed May 24, 1980 (U.S. counterpart application Ser. No. 266,243, filed May 22, 1981).

Another known method of comparison consists in the utilization of the moiré effect obtained when the periodic original is superimposed with the copy. If the copy is imperfect owing to distortion, the moire stripes thus formed have a position which differs from that observed in the superposition of two ideal periodical structures. Details of the moiré technique are described, e.g., in the article on p. 2455 of "Applied Optics", Vol. 11, 1972.

All hitherto known parallel measuring methods are restricted in their sensitivity to a value of approximately $\geq 0.5$ $\mu$m. Interferometric methods have the further disadvantages that they do not easily permit the investigation of the above described translation and rotation defects.

On the other hand, moiré methods always permit the recording of all distortion errors. However, their sensitivity is in the order of the grating period used (approximately 0.1 grating period). The grating used for testing an optical system can only be made so fine that it can be resolved as a grating when imaged by the system to be tested. The smallest structures that can be resolved by photolithographic copies used today are approximately 2 $\mu$m, so only those gratings can be used whose grating constant is higher than, or equal to 4 $\mu$m. The possible sensitivity of these prior moiré-metrical methods used with such gratings is thus limited to roughly 0.5 $\mu$m, and thus they do not meet the above-mentioned requirements of a sensitivity of 0.1 $\mu$m.

It is therefore an object of the present invention to provide a moiré-metrical method for testing the imaging characteristics of optical imaging systems which permits testing of large fields of view in parallel with a precision of 0.1 micrometer.

DISCLOSURE OF THE INVENTION

This invention is a method including two steps, in a first of which an original grating is transferred as a contact copy onto a substrate. In a second step the imaging system to be tested copies the original grating for a second time onto the substrate rotated by a small angle. The grating copies on the substrate which are slightly rotated relative to each other generate moiré stripes whose deviation from the ideal position permit conclusions about the imaging defects. For evaluating the moiré pattern with the necessary precision the pattern is illuminated, and the interference patterns obtained are observed in a high order of diffraction.

With this method, all distortion defects over the entire field of view can be measured with a resolution of approximately 0.1 micrometers. The technical efforts required for this method are very small and the demands made on the quality of the optical and mechanical components of the evaluating device are easily met. The device required for testing is light and transportable, and it can be used e.g. for the daily testing of photolithographic systems in semiconductor production. The evaluation of the moiré stripes is uncomplicated and can be done either visually, or through electro-optical scanning with subsequent electronic image processing. This moiré-metrical method can also be used along with the interferometric methods of copending application Ser. No. 266,243 which can then reach an even higher precision.

BRIEF DESCRIPTION OF THE DRAWINGS

FIG. 2A shows the moiré pattern obtained through the superposition of two grating structures on a substrate, when observed in the first order of diffraction, while

FIGS. 5A, 5B, and 5C show various grating fields with orthogonal partial gratings.

BEST MODE FOR CARRYING OUT THE INVENTION

Figure 1A:
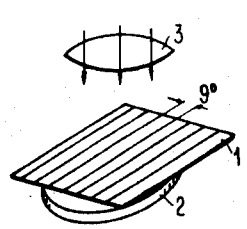
FIGS. 1A, 1B, and 1C illustrate schematically the individual steps of the moiré-metrical method of the present invention.
Figure 1B:
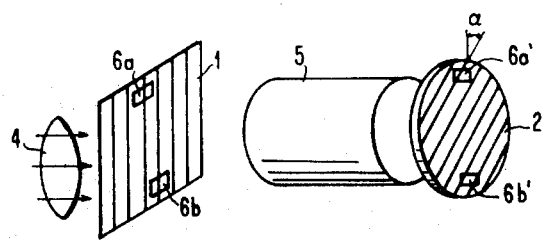
Figure 1C:
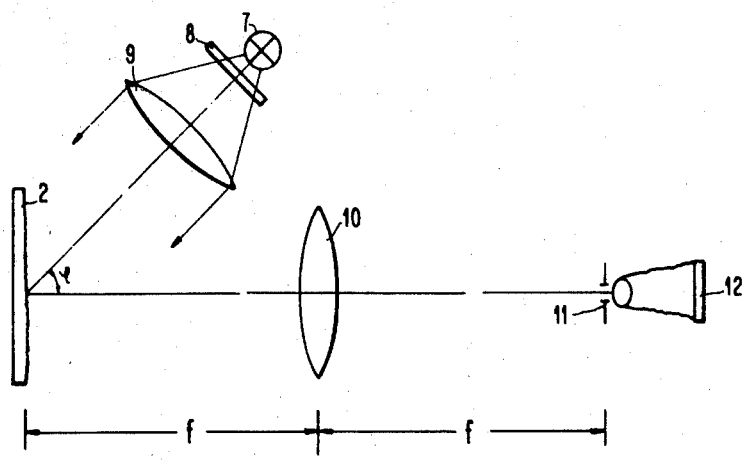

FIGS. 1A, 1B and 1C schematically represent the three steps for carrying out the inventive moiré-metrical method for testing optical imaging systems. FIG. 1A shows the contact copying of a grating pattern 1 onto a substrate 2 by a light beam 3. The grating has e.g. a grating constant $g_o = 4$ μm. In order to minimize distortions of the grating form in the contact copy the grating as well as the substrate have to be very flat; therefore, both are made of quartz and to a flatness of $\lambda/5$ and $\lambda/4$. The grating copy on the substrate consists of a correspondingly formed chromium pattern which is defined by the usual photolithographic methods.

In the method described above the distortion of the grating copy is approximately 0.1 micrometer. If this distortion is disturbing in high precision measurements the contact copy can be measured in accordance with the method described in the aforementioned copending application Ser. No. 266,243, and the error can be corrected subsequently.

In the second process step shown in FIG. 1B, the identical grating 1 is illuminated by a light beam 4 and is imaged by imaging system 5 to be tested onto the same substrate 2 which also shows the contact copy of the grating. The optical imaging system is e.g. a photolithographic copier. After this imaging, the second grating copy is developed as a chromium pattern on substrate 2 in accordance with the conventional photolithographic methods.

For the moiré-metrical method of this invention, the grating copy generated in accordance with FIG. 1B is rotated by a predetermined angle α relative to the contact copy produced in accordance with step 1. This angle α is represented in FIG. 1B as an angle against the vertical since original grating 1 is shown in a vertical orientation in this figure. For the precise alignment of the relative position of grating 1 and substrate 2 in the imaging step illustrated in FIG. 1B, the grating shows measuring marks 6a, 6b permitting an alignment of the corresponding marks 6a', 6b' on the contact copy, and a rotation of the substrate with a precision of 0.1 μm. An example for such measuring marks will be discussed in connection with FIG. 4. The angle α is ~1 minute of arc.

Figure 3A:
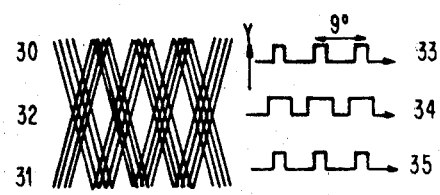
FIG. 3A shows an enlarged section of the superposition of two grating structures on a substrate.

Owing to the double exposure of substrate 2, a pattern like a cross grating is formed thereon; a section thereof is shown in FIG. 3A. Chromium ridges 30 of the one pattern, and ridges 31 of the second pattern slightly rotated relative thereto, include diamond-shaped free areas 32. The points of intersection of the two superimposed gratings produce moiré stripes whose ideal position can be precisely calculated with ideal gratings being assumed. If the imaging system to be tested shows distortions, the position of the moiré stripes observed does not correspond to the calculated position. The deviation is then a measure for the imaging errors.

The various distortion defects specifically influence the moiré pattern. A shift of the two gratings vertically to the grating lines effects a translation of the moiré stripes. A rotation of one grating against the other grating causes an alteration of the moiré period, and a defect of the imaging scale causes a rotation of the moire stripes.

The sensitivity and the precision of the method depend on how precise the position of the moiré stripes and their deviation from the ideal position can be determined. With a grating period of 4 micrometers, the position of the moiré stripes has to be determined to 1/40 of their period. This precision can not be reached when the moiré stripes are observed directly, as they will then appear as relatively broad and diffusely limited stripes (see FIG. 2A).

For a precise evaluation the invention therefore illuminates the cross-grating pattern of the superimposed gratings with an approximately flat, preferably monochromatic light wave, and observes a high diffraction order under the thus formed diffraction orders. The moiré stripes will then be very narrow and can be measured with high precision as shown in FIG. 2B.

The evaluation device for the moiré pattern is shown in FIG. 1C. A light source 7 with a series-arranged monochromatic filter 8, and a condenser 9 generate a light beam impinging at an angle ρ onto substrate 2 which satisfies the following condition: $\sin \rho = n = \lambda/g_o$. In this arrangement the n-th order of diffraction can thus be observed orthogonally to substrate 2. The diffracted light is directed by a lens 10 arranged at the distance of its focal length f onto a recording device 12 and series-arranged aperture 11, which are arranged behind lens 10 at a distance f. Recording device 12 can be either a photographic camera or a photoelectric recording element.

Figure 2A:
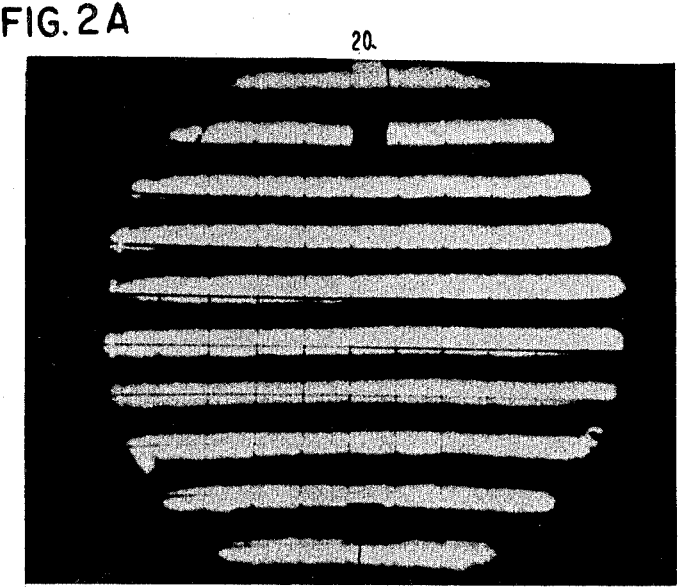
Figure 2B:
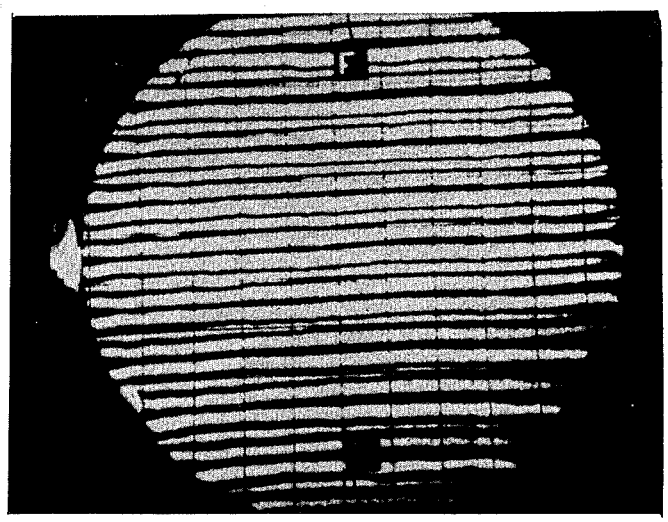
FIG. 2B shows the moiré pattern obtained in this way when observed in the third order of diffraction.

FIGS. 2A, 2B show the same moiré pattern when observed in different orders of diffraction. The recordings show the wafer-shaped substrate (whose diameter corresponds to the field of view to be tested). The substrate shows adjustment marks 6a', 6b', and also a cross-grating 20 which had also been photolithographically applied on the substrate. This grating is used as a reference grating for the precise determination of the position of the moiré stripes which appear in FIG. 2A as relatively broad, dark ribbons between the cross-grating lines.

If the same substrate is observed in a high order of diffraction the image as shown in FIG. 2B is obtained. The broad moiré ribbons are split into several sharp lines of differing intensity. From the position of these sharp lines relative to the reference grating it is now possible to reduce the imaging errors with the necessary high precision. The evaluation is particularly uncomplicated when the reference lines are applied on the substrate in those places where the ideal moiré stripes should appear in an ideal image.

The splitting of the moiré lines when observed in a high order of diffraction, and the different intensity of these moire lines when observed in a high order of diffraction, and the different intensity of these moiré lines can be explained with reference to FIGS. 3A and 3B.

If horizontal cuts are made through the cross-grating obtained from the two superimposed gratings, periodic sectional views are obtained with the same periodicity (the grating constant $g_o$) but with different duty ratios (this term refers to the ratio of the width of the opaque chromium ridge to the grating constant $g_o$). The duty ratio changes periodically when advancing on the substrate surface in Y-direction. Three examples for horizontal sections (in X-direction) with differing duty ratio are shown in FIG. 3A under reference numbers 33, 34, and 35.

The intensity $I_n$ in the n-th order of diffraction of a grating with a duty ratio t can be expressed as follows:

$$I_n = (1/n)^2 \sin^2 \pi n t.$$

In a specific order of diffraction the intensity of a periodically changing duty ratio is modulated. The number of moiré stripes is thus increased by a factor of n when observed in the n-th order of diffraction, and the stripe width is decreased by a factor of n. This corresponds to a sensitivity increase for evaluation by a factor of n in the same manner as if the grating constant of the grating used would have been decreased by the factor n (as mentioned previously, however, such narrow gratings can no longer be resolved by the imaging system).

Figure 3B:
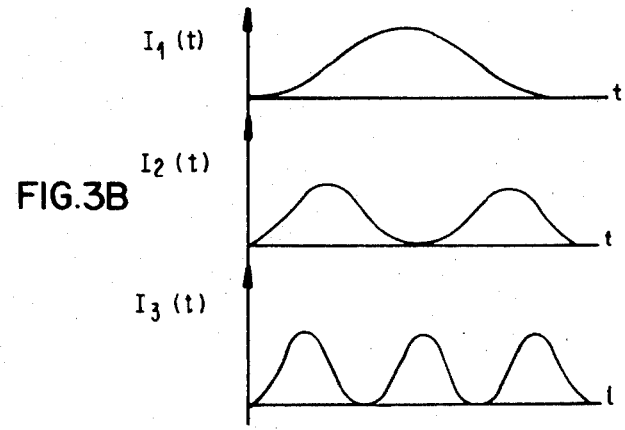
FIG. 3B shows the diffraction intensity I (t) of different orders of diffraction as a function of the duty ratio of the grating.

FIG. 3B is a schematic representation of intensity $I_n$ of the diffraction as a function of the duty ratio for different orders of diffraction. The splitting of the lines with high diffraction corresponds to the sharpening of the lines in FIG. 2B.

The high sensitivity of the method described here is based substantially on two factors:
The observation in a high order of diffraction, i.e. higher precision in reading
the observation of two superimposed gratings that are both provided in the same plane (the substrate plane).

Without the second step, the original grating (on one substrate) and the grating copy (on another substrate) would have to be arranged one over the other while being spatially separated, in order to produce moiré patterns. However, this would produce a series of uncontrollable negative influences (e.g. thickness variations of the substrates, distance variations, etc.) which cause greater distortions of the moiré pattern than the defects of the present imaging system.

Figure 4:
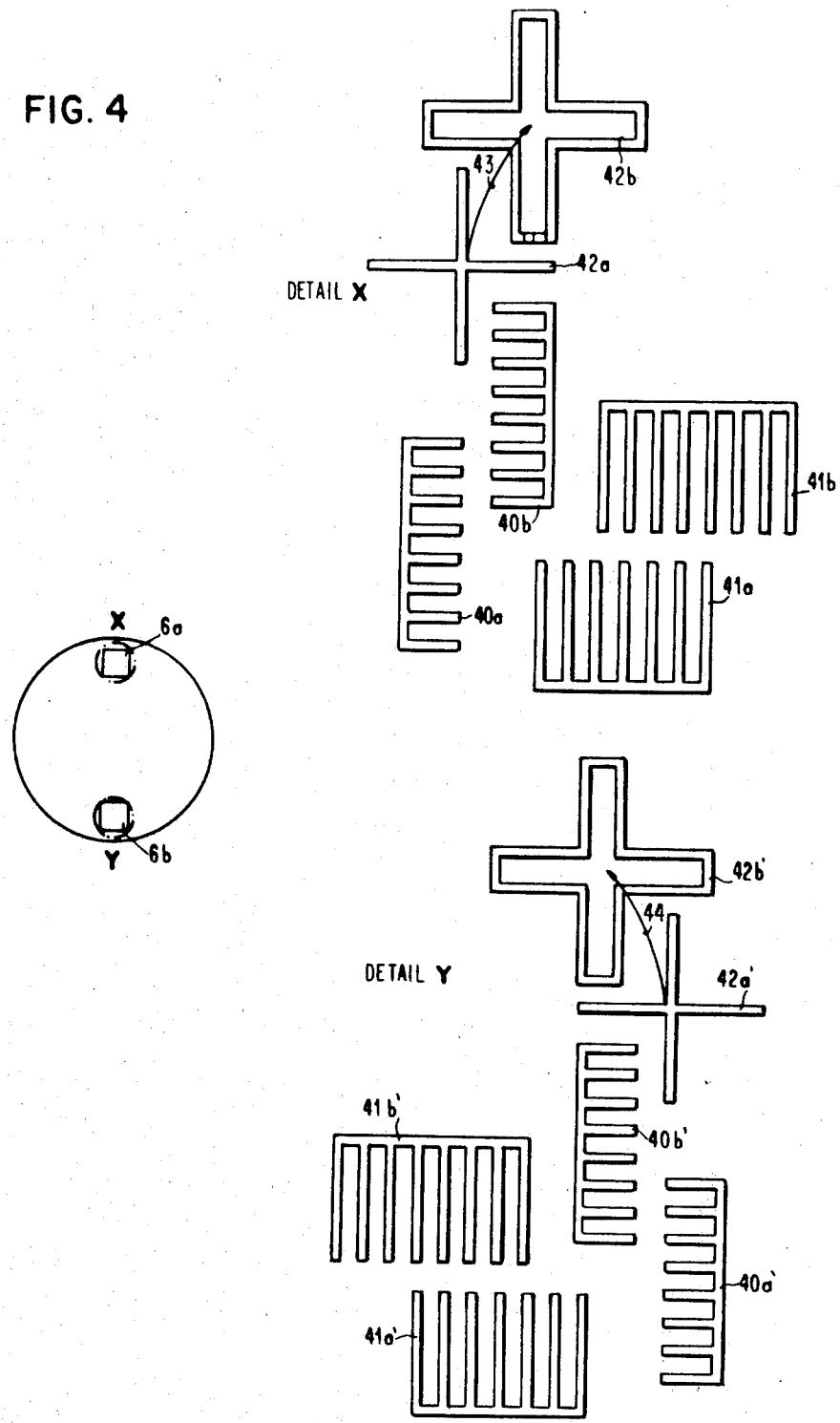
FIG. 4 shows an example of the measuring marks on a substrate for setting a precisely defined rotation between the two exposure steps used in the method of this invention.

FIG. 4 is an example of the adjustment marks that can be used for the precisely defined rotation of the two gratings on the substrate. Each mark consists of two pairs (vernier pairs) of comb-like measuring line sequences 40a, 40b and 41a, 41b arranged vertically to each other, and two crosses 42a, 42b whose legs extend in parallel to the comb directions. Comb and cross pairs are staggered obliquely relative to each other. They can be made to coincide by means of a corresponding relative shift of the original grating and substrate; for increased precision the comb elements are adjusted in such a manner that the comb and gap coincide. For rotation adjustment pattern 6a, which is on top when the ridges of the original grating are oriented vertically, is made to coincide through a relative shift toward the grating ridges, and subsequently to the right perpendicularly to the grating ridges (movement in the direction of arrow 43), and the adjustment pattern below is made to coincide through a corresponding movement to the left perpendicularly to the grating ridges (movement in the direction of arrow 44). With these adjustment marks, the rotation can be set to 0.1 μm.

With the above described method, the horizontal and the vertical component of the distortion are determined by two measuring steps with different substrates. Therefore the orthogonality defect cannot be determined directly. However, this defect can be determined in a measuring process through the following development of the invention.

Instead of a linear original grating, a grating field is used whose partial gratings are arranged perpendicularly to each other. FIG. 5A shows an example of such a grating field with a strip-shaped arrangement of the partial gratings (50a, 50b, 50c, . . . vertical orientation, and 51a, 51b, 51c horizontal orientation). The width of the partial gratings is such that it preferably corresponds to half the distance of the moiré stripes. The expected moiré stripes are represented in FIG. 5A as thick lines.

The stripe-shaped arrangement of the partial gratings in accordance with FIG. 5A still has the disadvantage that the horizontal moiré stripes show considerable gaps. In another grating field in accordance with FIG. 5B this disadvantage is avoided.

The stripe-shaped partial gratings are placed only in those areas where moiré stripes of the first order are expected. The width of the partial gratings is selected in accordance with the maximum distortion. In FIG. 5B the expected moiré stripes 53 are black and thick (53), and the area of their possible deviation is shown in dashed lines.

If the grating is designed in such a manner that the partial gratings are within the thus located areas (FIG. 5B), moiré stripes with only slight interruptions (FIG. 5C) are obtained. The limitation of the grating to a narrow area only shows the additional advantage that in higher orders of diffraction there are no disturbing intermediate stripes (FIG. 2B), which facilitates automatic evaluation.

FOR displaying the moiré system, the substrate should be illuminated obliquely from two directions vertical to each other, with two respective arrangements as shown in FIG. 1C.

Having thus described our invention, what we claim as new, and desire to secure by Letters Patent is:

1. A method for testing optical imaging systems using moiré patterns to indicate imaging system errors, said method comprising the steps of:
generating a first copy of an optical grating structure on a substrate, generating a second copy of said optical grating structure on said substrate by the imaging system to be tested, wherein said second copy of said grating structure is rotated relative to said first copy by a small angle α, and illuminating said superimposed grating copies to create a moiré pattern and observing said pattern in an order of diffraction higher than a first order of diffraction.

2. The method of claim 1, wherein said copies are generated photolithographically on said substrate.

3. The method of claim 1, wherein the grating constant of said optical grating structure is in the range of micrometers.

4. The method of claim 1, including the further step of providing reference lines on said substrate preferably corresponding to the position of moiré patterns that would be produced by using an ideal grating and an ideal imaging system.

5. The method of claim 1, including the step of providing precision measuring marks having vernier structure on said original grating and said substrate, said measuring marks being used to set the degree of relative rotation between said first and second copies.

6. The method of claim 1, wherein said superimposed grating copies are illuminated by a light beam having an angle of incidence to the plane of said substrate which corresponds to the angle of diffraction of said observed order of diffraction.

7. The method of claim 6, including the further step of recording said moiré pattern in a high order of diffraction by imaging said moire pattern onto a photographic recording device.

8. The method of claim 7, wherein said imaging is achieved by an imaging element located at a distance from said substrate equal to its focal length, and wherein said photographic recording device is spaced from said imaging element by a distance equally corresponding to said focal length.

9. The method of claim 1, wherein said optical grating structure is a grating field having partial gratings thereon which are oriented vertically to each other.

10. The method of claim 9, wherein said partial gratings are arranged in stripes.

11. The method of claim 10, including the step of forming said partial gratings in substrate areas where moiré stripes are to be expected, said partial gratings being formed with a width corresponding to the expected maximum deviation of said moiré stripes from their positions if said optical grating and said optical imaging system were ideal.

* * * * *